US008793962B2

(12) United States Patent
Edeline

(10) Patent No.: US 8,793,962 B2
(45) Date of Patent: Aug. 5, 2014

(54) TRIM ASSEMBLY FOR A PORTION OF THE PASSENGER COMPARTMENT OF A MOTOR VEHICLE COMPRISING A PLURALITY OF TRIM PARTS

(75) Inventor: Franck Edeline, Le Vaumain (FR)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 13/528,750

(22) Filed: Jun. 20, 2012

(65) Prior Publication Data
US 2013/0145721 A1  Jun. 13, 2013

(30) Foreign Application Priority Data
Jun. 21, 2011  (FR) ..................... 11 55467

(51) Int. Cl.
*E04C 2/38* (2006.01)
(52) U.S. Cl.
USPC .................. 52/716.5; 52/716.6; 296/37.1
(58) Field of Classification Search
USPC .............. 52/716.5, 716.6, 716.7, 716.1; 296/37.1, 37.12
See application file for complete search history.

(56) References Cited

U.S. PATENT DOCUMENTS 2,657,967 A * 11/1953 Gilchrist ................. 312/246
4,630,857 A * 12/1986 Zweiniger et al. ........ 296/37.12
4,878,706 A * 11/1989 Novikov ................... 296/37.1
5,558,385 A * 9/1996 Gross et al. ............... 296/37.12
6,722,719 B1 * 4/2004 Sturt ......................... 296/37.8
2002/0158490 A1* 10/2002 Hutzel ....................... 296/197
2006/0208506 A1* 9/2006 Kern et al. ................. 292/304
2007/0013202 A1* 1/2007 Tompson ................... 296/37.1
2008/0001422 A1 1/2008 Kwolek
2008/0231060 A1* 9/2008 Carabalona et al. ....... 292/251.5
2011/0006557 A1 1/2011 Koizumi et al.

FOREIGN PATENT DOCUMENTS

FR  2833908  6/2003

OTHER PUBLICATIONS

French Search Report for FR application No. 1155467, dated Mar. 5, 2012, 2 pages (in French only).
Opinion for FR application No. 1155467, dated dated Mar. 5, 2012, 4 pages (in French only).

* cited by examiner

*Primary Examiner* — Basil Katcheves
(74) *Attorney, Agent, or Firm* — Reising Ethington P.C.

(57) ABSTRACT

A trim assembly having a structural part (2), first and second trim parts (14, 20), and at least one intermediate trim part (30). The second trim part (20) is attached on a second portion (10) of the structural part (2), and has an aspect face (22) extending between a first edge (24) and a second edge (26). The intermediate trim part (30) has an aspect face extending between a first edge (32) and a second edge (34), the second edge (34) being positioned facing the first edge (24) of the second trim part (20). The second trim part (20) is moveably mounted on the second portion (10), and the intermediate trim part (30) has a member capable of displacing the second trim part (20).

10 Claims, 3 Drawing Sheets

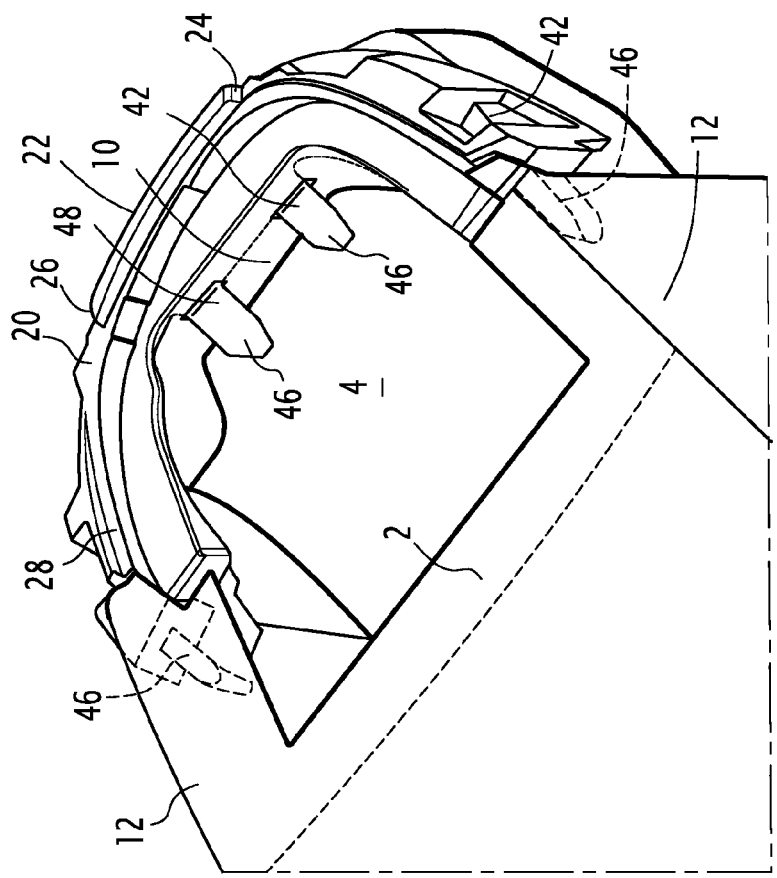
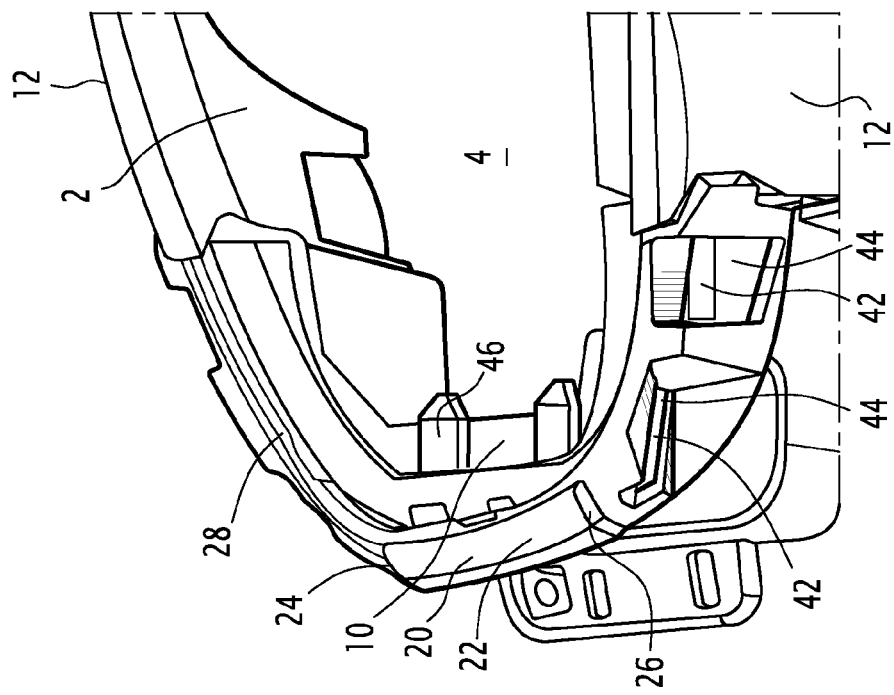

TRIM ASSEMBLY FOR A PORTION OF THE PASSENGER COMPARTMENT OF A MOTOR VEHICLE COMPRISING A PLURALITY OF TRIM PARTS

TECHNICAL FIELD

The present invention relates to a trim assembly for a portion of the passenger compartment of a motor vehicle and, in particular, to such assemblies that include multiple trim pieces that connect together during assembly.

BACKGROUND

The passenger compartment of a motor vehicle is provided with several trim parts giving the possibility of providing particular aesthetics to this passenger compartment. Some of these parts are laid out adjacent to each other in order to conceal technical interfaces of the passenger compartment. These parts each have a specific shape in order to be fitted to the portion of the passenger compartment which it covers and comprises means for attachment to this portion. It should be ensured that the transition from one trim part to the other occurs without any play between the parts, such a play being detrimental to the aesthetics of the trim assembly. Thus, the edges of the adjacent trim parts should be applied against each other without any space between the latter. This is referred to as managing flush fits between the trim parts.

Such management may be complicated when the trim parts are parts in injected plastic material, since it is difficult to predict dispersions and material removals caused during the making of the different trim parts. Further, if the management of the positioning and of the dimensioning of two adjacent trim parts may be carried out simply by isostatism, it is impossible to guarantee positioning without any play when a trim part has to be positioned adjacent between two other trim parts. Indeed, the transition between one of the trim parts and the intermediate trim part may be achieved without any play by isostatism, but there will then be a play between the other trim part and the intermediate trim part.

As an example, for a central console of a motor vehicle, extending under the dashboard between the front seats of the vehicle, the trim of the structure of the console is accomplished by a portion of the dashboard, by two trim elements of the flanks of the console and by a rear trim element extending on the extreme portion of the structure of the console facing the occupants of the vehicle. The flush fits should then be managed between all these trim parts without there being any play between the edges of these parts, which is impossible without reworking the parts once they are mounted in the vehicle or without concealing the transitions between the parts, for example by additional upholstery parts. The assembly time and the manufacturing costs then become very high.

SUMMARY

One of the objects of the invention is to overcome these drawbacks by proposing a trim assembly comprising a trim part positioned between two other trim parts, in which all the plays between the edges of these parts are suppressed in a simple and inexpensive way.

For this purpose, the invention relates to a trim assembly having a structural part, first and second trim parts, and at least one intermediate trim part. The structural part is intended to be attached to the passenger compartment of the motor vehicle. The first trim part is attached on a first portion of the structural part, the first trim part comprising an aspect face extending between a first edge and a second edge. The second trim part is attached on a second portion of the structural part, the second trim part comprising an aspect face extending between a first edge and a second edge. The intermediate trim part is attached on the structural part and extends between the first and second trim parts, the intermediate trim part comprising an aspect face extending between a first edge and a second edge, the first edge of the aspect face of the intermediate trim part being positioned so as to bear against the first edge of the aspect face of the first trim part and the second edge of the aspect face of the intermediate trim part being positioned facing the first edge of the aspect face of the second trim part, of the aforementioned type, wherein the second trim part is moveably mounted on the second portion of the structural part and the intermediate trim part comprises a member capable of displacing the second trim part so as to have the first edge of the aspect face of the second trim part bear against the second edge of the aspect face of the intermediate trim part.

The displacement of the second trim part by means of the member of the intermediate trim part gives the possibility of simply managing the flush fit between the intermediate trim part and the second trim part, while the flush fit of the intermediate trim part and of the first trim part may be managed in a known way by isostatism. A trim assembly is thereby obtained in which the transition between the trim parts occurs without any play in a simple way upon mounting the trim assembly, i.e. without requiring additional fitting operations.

At least some embodiments of the invention may include one or more of the following features.

- The second trim part is mounted so as to be translationally moveable relatively to the second portion of the structural part, along a direction for bringing the first edge of the aspect face of the second trim part closer to the second edge of the aspect face of the intermediate trim part.
- The member is a guiding pin received in a lumen of the second trim part, the insertion of the guiding pin into said lumen causing displacement of the second trim part on the second portion of the structural part so as to have the first edge of the aspect face of said second trim part bear against the second edge of the aspect face of the intermediate trim part.
- The lumen of the second trim part is positioned facing an orifice of the structural part, the guiding pin passing through the lumen of the second trim part and being introduced into the orifice of the structural part, the introduction of the guiding pin into said orifice causing positioning of the second trim part relatively to the structural part and relatively to the intermediate trim part.
- The lumen is formed on a structural portion of the second trim part, adjacent to the aspect face, the guiding pin protruding from an extreme portion of the internal face of the intermediate trim part, opposite to the aspect face of said intermediate trim part, said extreme portion covering the structural portion of the second trim part.
- The intermediate trim part comprises an upstream guiding pin and a downstream guiding pin, the second trim part comprising an upstream lumen and a downstream lumen, the insertion of the upstream guiding pin into the upstream lumen causing positioning of the second trim part along the direction for coming closer and the insertion of the downstream guiding pin into the downstream lumen causing the positioning of the second trim part along the direction for coming closer and along a direction for raising the structural part.

The second trim part comprises at least one centering pin protruding from the second trim part along the direction for coming closer, the structural part comprising at least one orifice for receiving said centering pin, said centering pin positioning and guiding the displacement of said second trim part relatively to the structural part when said centering pin is introduced into said receiving orifice.

The structural part comprises two flanks connected to each other through the first portion and through the second portion, said portions extending on either side of said flanks, the trim assembly comprising two intermediate trim parts extending over each flank of the structural part between the first and second trim parts, respectively.

Both intermediate trim parts are parts in injected plastic material stemming from a same mold.

The structural part forms the body of a central console of a motor vehicle and defines a storage space.

BRIEF DESCRIPTION OF THE DRAWINGS

Other aspects and advantages of the invention will become apparent upon reading the following description, given as an example and made with reference to the appended drawings, wherein:

FIG. 2 is a schematic perspective illustration of a downstream extreme portion of the assembly of FIG. 1, FIG. 3 is a schematic perspective illustration of the extreme portion of FIG. 2 according to another viewing angle.

DETAILED DESCRIPTION OF THE ILLUSTRATED EMBODIMENTS

In the description, the terms of "upstream" and "downstream" are defined according to the front-rear direction of an assembled motor vehicle, upstream being located towards the front of the vehicle and downstream towards the rear of said vehicle. The term of "transverse" is defined according to the width of the vehicle, i.e. according to a direction substantially perpendicular to the front-rear direction in a horizontal plane.

Figure 1:
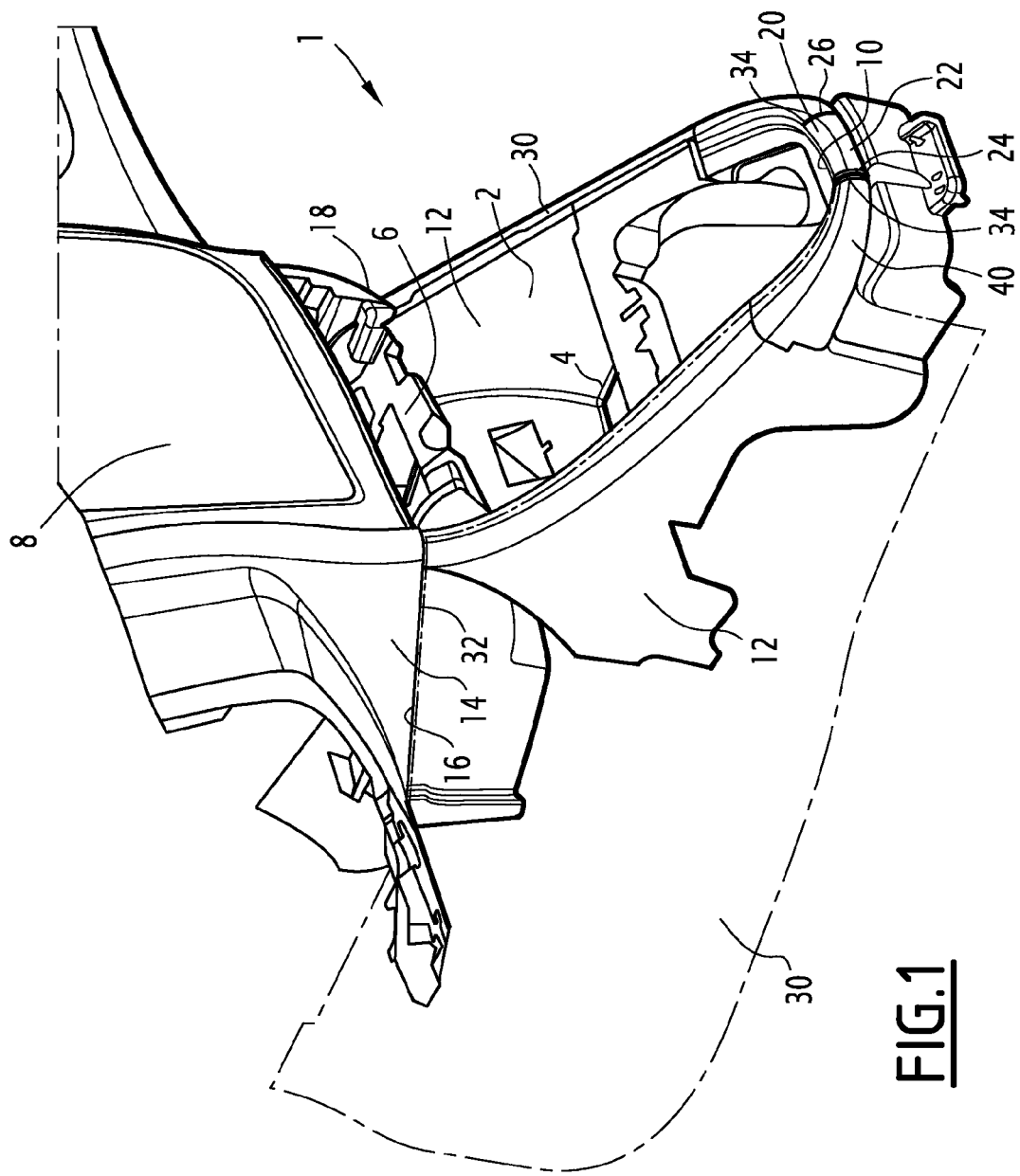
FIG. 1 is a schematic perspective illustration of a trim assembly according to the invention, applied to a central console of a motor vehicle.

With reference to FIG. 1, a trim assembly 1 of a portion of the passenger compartment of a motor vehicle is described. In this figure, the trim assembly 1 is applied to the central console extending under the dashboard between the front seats of the vehicle, i.e. "at the feet" of the occupants of the vehicle. However it is understood that the invention is not limited to such a central console and that the trim assembly may be applied to any portion of the passenger compartment in which a trim part has to be positioned between two other trim parts without any play between the edges of these parts.

The trim assembly 1 comprises a structural part 2, forming the body of a central console of a motor vehicle and defining a storage space 4 according to the example illustrated in the figures. Generally, by structural part is meant a part being used for defining a particular function in the passenger compartment of the vehicle, for example storage in the present example or a function for stiffening or supporting other parts, etc., unlike a trim part essentially having the function of improving the aesthetics of the passenger compartment. The structural part 2 illustrated in the figures comprises a first extreme portion 6, extending substantially transversely on the upstream side and surmounted with a dashboard 8 structure, and a second extreme portion 10 extending substantially transversely on the downstream side of the other side of the storage space 4 relatively to the first extreme portion 6. The first extreme portion 6 is connected to the second extreme portion 10 with two flanks 12 extending on either side of the storage space 4 along the upstream-downstream direction.

In order to improve the aspect of the passenger compartment of the vehicle, the flanks 12 and the second extreme portion 10 of the structural part 2, visible from the passenger compartment of the vehicle, have to be covered with upholstery, this upholstery has to be perfectly integrated with the upholstery of the dashboard 8 structure, at the junction between the flanks 12 and the first extreme portion 6.

The trim assembly 1 thus comprises a first trim part 14 formed by the upholstery of the dashboard 8 structure in the example illustrated in the figures. The first trim part 14 extends over the first extreme portion 6 of the structural part 2, as illustrated in FIG. 1 and comprises an aspect face visible from the passenger compartment of the motor vehicle. The aspect face extends between a first edge 16 applied opposite the junction between the first extreme portions 6 and one of the flanks 12 of the structural part (2), and a second edge 18 applied opposite the junction between the first extreme portion 6 and the other flank 12 of the structural part 2. The first and second edges 16 and 18 extend substantially towards the front of the vehicle from the junction of the first extreme portion 6 and of the flanks 12 of the structural part, in the example illustrated in FIG. 1. According to this example, the aspect face of the first trim part 14 is formed with plastic material, of the type: polypropylene (PP), polyethylene (PE), polycarbonate acrylonitrile-butadiene-styrène PC-ABS) or else with a dashboard skin in plastic material of the type: thermoplastic polyolefins (TPO), polyvinyl chloride (PVC) or other type, or in a textile or leather material or any other material suitable for cladding the dashboard of a motor vehicle.

Figure 4:
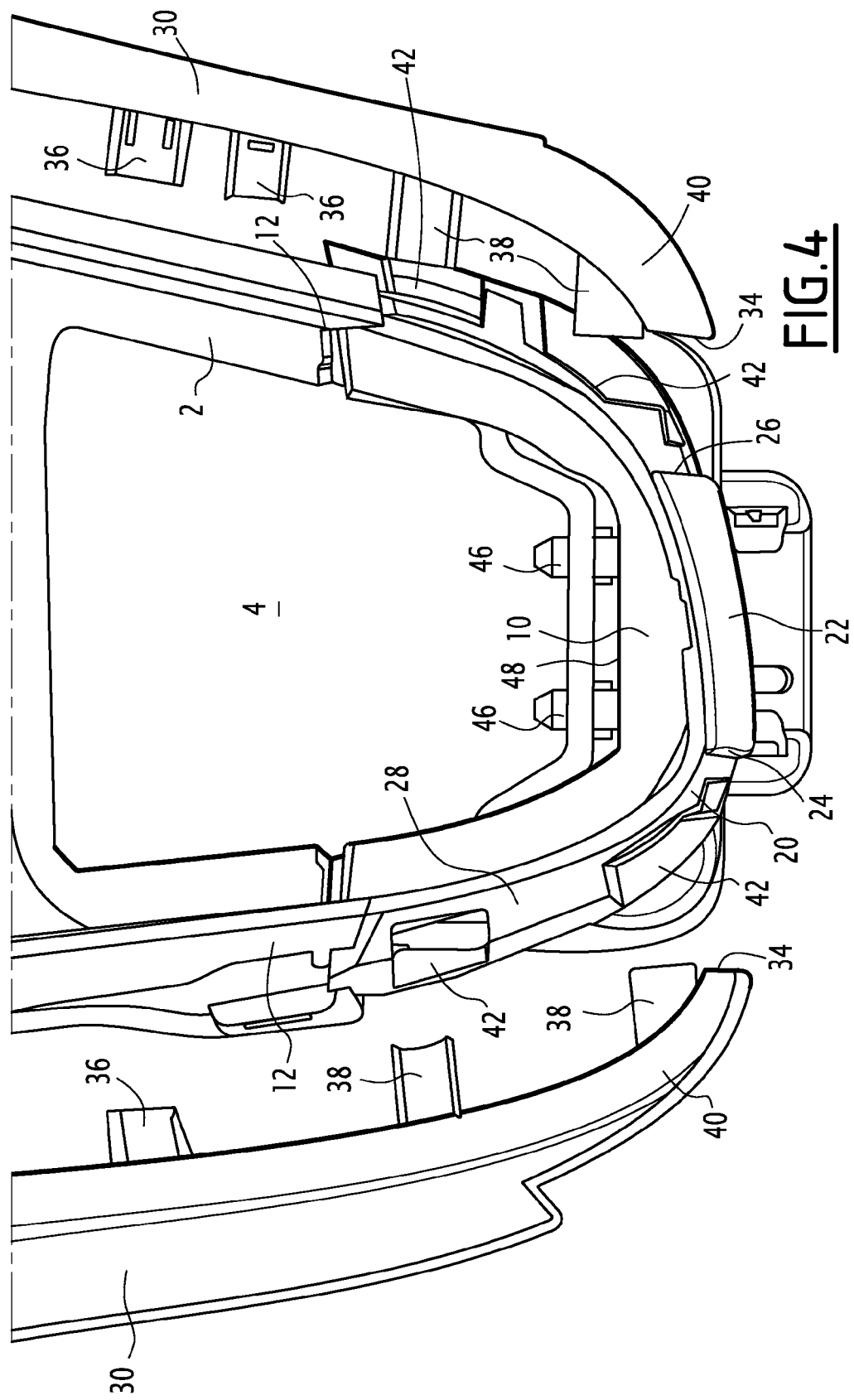
FIG. 4 is a schematic top illustration of the extreme portion of FIG. 2 upon attachment of intermediate trim parts.

The trim assembly further comprises a second trim part 20 attached on the second extreme portion 10 of the structural part 2. The second trim part 20 comprises an aspect face 22, visible from the passenger compartment of the motor vehicle, extending substantially transversely between a first edge 24 extending in the vicinity of the downstream end of one of the flanks 12 of the structural part 2 and a second edge 26 extending in the vicinity of the downstream end of the other flank 12 of the structural part 2. According to the example illustrated in the figures, the second trim part 20 also forms a structural part of the center console, i.e. it participates in forming the structure of the body of the console, such as a border of the storage space on which the lid of the console is intended to be closed. For this purpose, the second trim part 20 comprises a structural portion 28 extending on either side and on the internal face of the second trim part, turned towards the storage space 4 and opposite to the aspect face 22, so that the second trim part 20 has the shape of a U surmounting the second extreme portion 10 and extending over the downstream ends of the flanks 12 of the structural part 2, as illustrated in FIGS. 2-4. The aspect face 22 and its first and second edges 24, 26 extend protruding from the structural portion 28. Thus, in the example illustrated in the figures, the aspect face 22 only extends over a portion of the second trim part 20, notably the one which is intended to cover the second extreme portion 10 of the structural part 2. Such a trim part 20 is designated as a console bracket. The structural portion 28 is for example provided with means (not shown) for retaining a lid of the console.

The structural portion 28 further comprises means for attaching the second trim part 20 on the structural part 2, as this will be described subsequently.

The trim assembly 1 further comprises at least one intermediate trim part 30 attached on the structural part 2 and extending between the first and second trim parts 14 and 20. In the example illustrated in the figures, the trim assembly 1 comprises two intermediate trim parts 30 each covering one of the flanks 12 of the structural part 2 between the first and second trim parts 14 and 20. The intermediate trim part 30 comprises an aspect face, visible from the passenger compartment of the motor vehicle, concealing the flanks 12 of the structural part 2 and optionally of other structural parts of the passenger compartment of the vehicle. The aspect face extends between a first edge 32 extending facing the first edge 16 of the aspect face of the first trim part 14 and a second edge 34 extending facing the first edge 24 of the aspect face of the second trim part 20. According to the example illustrated in the figures, the first and second edges of the aspect face of the other intermediate trim part 30 respectively extend facing the second edge 18 of the aspect face of the first trim part 14 and the second edge 26 of the aspect face of the second trim part 20.

The intermediate trim parts 30 are made so that the first edge 32 of their aspect face is bearing respectively against the first edge 16 and the second edge 18 of the aspect face of the first trim part 14. By "bearing", it is meant that the edges are positioned against each other without any gap or play between these edges, i.e. the edge of the aspect face of the intermediate trim part is flush with the edge of the aspect face of the first trim part without showing the structural part 2 from the outside of the trim assembly 1. Having the first edge 32 of the intermediate trim parts 30 bearing against the first edge 16 and the second edge 18 of the first trim part 14 may be achieved in a simple and known way by isostatism. For this purpose, both intermediate trim parts 30 are for example made in injected plastic material and stem from a same mold, so that it is possible to have identical withdrawals and dispersions on both intermediate trim parts 30, thereby facilitating their placement by isostatism relatively to the first 16 and second 18 edges of the first trim part 14.

Each intermediate trim part 30 is attached on a flank 12 of the structural part 2 by at least one attachment pin 36 protruding from the internal face of the intermediate trim part 30, opposite to the aspect face, along a substantially transverse direction towards the structural part 2. The structural part 2 comprises at least one orifice (not shown) for receiving the attachment pin 36, the intermediate trim part 30 being attached onto the structural part 2 when the attachment pin 36 is introduced into the receiving orifice. According to an embodiment, the intermediate trim part 30 is attached to the structural part 2 through a plurality of attachment pins 36 distributed over the internal face of the intermediate trim part 30 along the upstream-downstream direction, the structural part 2 comprising as many corresponding receiving orifices.

In order to allow the second edge 34 of the intermediate trim parts 30 to bear against the first 24 and second 26 edges of the aspect face 22 of the second trim part 20 respectively, the second aspect part 20 has a degree of freedom relatively to the structural part 2, i.e. it is moveably mounted relatively to the second extreme portion 10 of the structural part 2. More particularly, in the example illustrated in the figures, the second trim part 20 is mounted so as to be translationally moveable along a direction for bringing the first and second edges 24, 26 closer to the second edges 34 of the intermediate trim parts. According to the example illustrated in the figures, the direction for bringing them closer is substantially the upstream-downstream direction. The translational displacement of the second trim part 20 allows the edges of its aspect face to be brought closer to the edges of the aspect face of the intermediate trim parts in order to cause them to bear against each other and to thereby have an upholstery of the structural part 2 without any defect, i.e. without the structural part 2 appearing from the outside of the trim assembly 1.

The displacement of the second trim part 20 relatively to the structural part 2 is achieved by mounting the intermediate trim parts 30. To do this, each intermediate trim part 30 comprises at least one member capable of displacing the trim part 20 translationally so as to put it in place. This member is a guiding pin 38 protruding from an extreme portion 40 of the internal face of the intermediate trim part 30 along a substantially transverse direction. This extreme portion 40 covers a portion of the structural part 28 of the second trim part 20, this portion extending on one side of the aspect face 22 on the downstream extreme portion of a flank 12 of the structural part 2. A lumen 42, with a shape substantially mating that of the guiding pin 38, is formed in this portion of the structural part 28 and crosses this portion so as to allow the guiding pin 38 to pass through this lumen 42. An orifice 44 is formed in the structural part 2 facing the lumen 42 so as to receive the guiding pin 38. Thus, introduction of the guiding pin 38 into the lumen 42 and then into the orifice 44 causes positioning of the second trim part 20 relatively to the structural part 2 and relatively to the intermediate trim part 30 so that the first edge 24, the second edge 26, respectively, of the aspect face 22 of the second trim part 20 will bear against the second edge 34 of the aspect face of the intermediate trim part 30. The positioning therefore occurs simply without any additional positioning step after attachment of the intermediate trim parts 30 on the structural part 2.

According to the embodiment illustrated in FIG. 4, each intermediate trim part 30 comprises an upstream guiding pin 38 and a downstream guiding pin 38, the second trim part 20 comprising an upstream lumen 42 and a downstream lumen 42, the insertion of the upstream guiding pin into the upstream lumen causing positioning of the second trim part 20 along the direction for coming closer and the insertion of the downstream guiding pin in the downstream guiding lumen causing the positioning of the second trim part along the direction for coming closer and along a direction for raising the structural part 2. Thus, the positioning of the second trim part 20 relatively to the structural part 2 and to the intermediate trim part 30 is accomplished in all directions, which guarantees an upholstery without any defect of the structural part 2 by the simple attachment of the intermediate trim part 30 on the structural part 2.

In order to allow the positioning, the maintaining and the guiding of the second trim part 20 in translation relatively to the structural part 2, the means for attachment of the structural portion 28 comprise at least one centering pin 46 protruding from the second trim part 20 along the direction for coming closer. The centering pin 46 cooperates with an orifice 48 for receiving said centering pin provided in the structural part 2, the centering pin 46 positioning and guiding the displacement of said second trim part 20 relatively to the structural part 2 when the centering pin 46 is introduced into the receiving orifice 48. According to the embodiment illustrated in FIGS. 2-4, the second trim part 20 comprises two centering pins 46 protruding from the structural portion 28 from the internal face of the second trim part 20 facing the aspect face 22. According to the embodiment illustrated in FIG. 3, the second trim part 20 further comprises two centering pins 46 protruding from the extreme portions of the structural portion 28, the orifices for receiving both of these centering pins being made in the thickness of the flanks 12 of the structural part 2.

As indicated earlier, although the invention has been more particularly described in connection with a central console of a motor vehicle, this invention applies when it is desired to fit out a structural part with three trim parts, one of which extends between the two other ones.

The invention claimed is:

1. A trim assembly of a portion of the passenger compartment of a motor vehicle, said assembly comprising:
   a structural part, intended to be attached to the passenger compartment of the motor vehicle;
   a first trim part attached on a first portion of the structural part, said first trim part comprising an aspect face extending between a first edge and a second edge;
   a second trim part moveably mounted on a second portion of the structural part, said second trim part comprising an aspect face extending between a first edge and a second edge and a structural portion adjacent to the aspect face of the second trim part, the structural portion of the second trim part protruding from an internal face of the second trim part; and
   an intermediate trim part attached on the structural part and extending between the first and second trim parts, the intermediate trim part comprising an aspect face extending between a first edge and a second edge, the first edge of the aspect face of the intermediate trim part being positioned so as to bear against the first edge of the aspect face of the first trim part and the second edge of the aspect face of the intermediate trim part being positioned facing the first edge of the aspect face of the second trim part,
   wherein the intermediate trim part comprises a member capable of displacing the second trim part so as to have the first edge of the aspect face of the second trim part bear against the second edge of the aspect face of the intermediate trim part, said member being configured to cooperate with the structural portion of the second trim part to displace the second trim part during attachment of the intermediate trim part such that the structural portion of the second trim part and the structural part are covered by the intermediate trim part and by the second trim part when the first edge of the aspect face of the second trim part bears against the second edge of the aspect face of the intermediate trim part, and
   wherein the aspect face of each one of the trim parts faces toward the inside of the passenger compartment so as to be visible to an occupant of the passenger compartment when assembled together to form the trim assembly and installed in the motor vehicle.

2. The trim assembly according to claim 1, wherein the second trim part is mounted so as to be translationally moveable relatively to the second portion of the structural part, along a direction for bringing the first edge of the aspect face of the second trim part closer to the second edge of the aspect face of the intermediate trim part.

3. The trim assembly according to claim 2, wherein the intermediate trim part comprises an upstream guiding pin and a downstream guiding pin, the second trim part comprising an upstream lumen and a downstream lumen, the insertion of the upstream guiding pin into the upstream lumen causing the positioning of the second trim part along the direction for coming closer and the insertion of the downstream guiding pin into the downstream lumen causing the positioning of the second trim part along the direction for coming closer and along a direction for raising the structural part.

4. The trim assembly according to claim 2, wherein the second trim part comprises at least one centering pin protruding from the second trim part along the direction for coming closer, the structural part comprising at least one orifice for receiving said centering pin, said centering pin positioning and guiding the displacement of said second trim part relatively to the structural part when said centering pin is introduced into said receiving orifice.

5. The trim assembly according to claim 1, wherein the member is a guiding pin received in a lumen of the second trim part, the insertion of the guiding pin into said lumen causing displacement of the second trim part on the second portion of the structural part so as to have the first edge of the aspect face of said second trim part bear against the second edge of the aspect face of the intermediate trim part.

6. The trim assembly according to claim 5, wherein the lumen of the second trim part is positioned facing an orifice of the structural part, the guiding pin passing through the lumen of the second trim part and being introduced into the orifice of the structural part, the introduction of the guiding pin into said orifice causing the positioning of the second trim part relatively to the structural part and relatively to the intermediate trim part.

7. The trim assembly according to claim 5, wherein the lumen is formed on a structural portion of the second trim part, adjacent to the aspect face, the guiding pin protruding from an extreme portion of the internal face of the intermediate trim part, opposite to the aspect face of said intermediate trim part, said extreme portion covering the structural portion of the second trim part.

8. The trim assembly according to claim 1, wherein the structural part comprises two flanks connected to each other through the first portion and through the second portion, said portions extending on either side of said flanks, the trim assembly comprising two intermediate trim parts extending on each flank of the structural part between the first and second trim parts, respectively.

9. The trim assembly according to claim 8, wherein both intermediate trim parts are parts in injected plastic material stemming from a same mold.

10. The trim assembly according to claim 1, wherein the structural part forms the body of a central console of a motor vehicle and defines a storage space.

* * * * *